April 3, 1962 F. H. GREEN 3,027,726
COOLING DEVICE
Original Filed June 22, 1959

INVENTOR:
FREDERICK H. GREEN,
BY J. Thomas Eubanks
Attorney.

United States Patent Office 3,027,726
Patented Apr. 3, 1962

3,027,726
COOLING DEVICE
Frederick H. Green, Palos Verdes Estates, Calif., assignor to The Garrett Corporation, Los Angeles, Calif., a corporation of California
Continuation of application Ser. No. 821,785, June 22, 1959. This application Nov. 25, 1960, Ser. No. 71,802
18 Claims. (Cl. 62—5)

This invention relates to the vortex tube cooling of air or other gases in which the hot tube of the vortex tube is cooled through the absorbed heat of vaporization of water in contact with the exterior surface of the hot tube and through which hot bleed gases from the hot end of the vortex tube are passed.

This application is a continuation of my copending application entitled Cooling Device, Serial No. 821,785, filed June 22, 1959, now forfeited.

It is well known that in vortex tube operation greater efficiency is obtained by the cooling of the hot tube of the vortex tube, and this has been accomplished either by bleeding off a portion of the air or gas from the end of the hot tube or by cooling the outer surface of the hot tube itself. According to the present invention, both of these cooling methods are employed and the external cooling is effected by a water jacket about the hot tube in which the water is cooled by evaporation thereof as the bleed air from the hot tube is passed therethrough, with the obtainable cooling represented by the heat of vaporization of the water.

It is therefore an object of this invention to provide means for improving the efficiency of operation of vortex tubes by providing for a more efficient cooling thereof.

Another object of the invention is to provide an air cooling device employing a vortex tube in which the hot tube of the vortex tube is cooled both by bleeding internal air from its end and by an external water jacket through which the bleed air is passed to effect cooling by evaporation.

Another object of the invention is a cooling device in accordance with the previous object, in which the bleed air is passed through a porous plate into the water jacket to introduce the air in the form of a multiplicity of relatively small bubbles.

A further object of the invention is to provide a cooling device in accordance with the preceding objects, in which the available cooling is increased by a longer and more intimate contact between the cooling water and the bleed gases, in that they are passed in counterdirectional relation through a tortuous path.

A still further object of the invention is a cooling device in accordance with the immediately preceding object which employs a portion of the bleed air as a water lift to flow the cooling water downwardly over a series of baffles through which the major portion of the bleed air passes upwardly.

Other objects and features of the invention will be readily apparent to those skilled in the art from the specification and appended drawing illustrating certain preferred embodiments in which.

Figure 1:
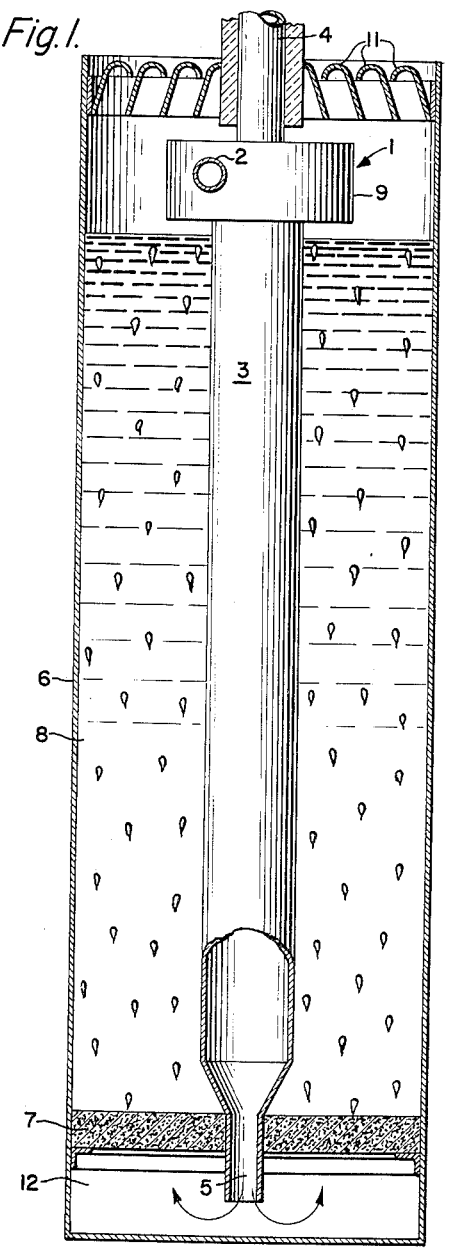
FIG. 1 is a schematic representation, partly in section, of a cooling device according to the present invention.

The cooling device of FIG. 1 employs a vortex tube, indicated generally at 1, as having an inlet 2, a hot tube 3 and a cold air outlet 4. A bleed opening from the end of the hot tube 3 is represented at 5 and can be made adjustable in known manner. About the tube 3 is a container 6 having a dividing wall 7 adjacent its lower end, beneath which communicates the bleed air opening 5 from the end of the hot tube 3. Above the plate 7 is a water jacket or column 8 in contact with the outer surface of the hot tube 3 and having any desired water level in operation, being here shown just below inlet collar 9 of the vortex tube. The top of the container 6 is provided with spray baffles 11 to permit the passage of exhaust air while preventing the exit of water spray from the container. The porous plate 7 may be a drilled plate, a sintered metal plate, or some form of plastic sponge.

In operation, the bleed air from the opening 5 at the end of the hot tube 3 will be passed into chamber 12 beneath the porous plate 7 and pass upwardly, after passing through the plate, in the form of very small bubbles through the water column 8. These bubbles, in their passage upwardly through gravitational action, will effect evaporation of the water to obtain cooling thereof by the absorbed heat of vaporization. The air then exhausts through the baffles 11 to remove entrained moisture and passes out of the apparatus. It will be noted that this arrangement is not restricted to operation along the wet bulb line of the psychrometric chart but is limited only by the amount of moisture which can be picked up by the air as it passes through the water. The cold air from outlet 4 will have the same absolute moisture content as the inlet compressed air entering through inlet 2.

It will be further seen that this manner of cooling the exterior of the hot tube of the vortex tube will use up water in operation, since the vaporized water will pass out with the exhaust air. Some means will be provided for maintaining the water level constant within the container 6, such as by a float valve controlling the addition of water from a suitable source.

The amount of cooling which can be advantageously effected with the apparatus of FIG. 1 will be limited by the problem of passing sufficient air through the water without having the water carried along with the exhaust air. To increase the heat absorbing capacity, the alternate construction of FIG. 2 may be utilized. As shown there, the vortex tube 16 has an inlet 17, a hot tube 18 and a cold air outlet 19. Surrounding the hot tube 18 is a tubular sleeve 21 spaced from the tube 18 to form an annular cylindrical chamber 22. About the tube 18 and sleeve 21 is disposed an outer container 23. The hot tube 18 is disposed substantially vertically and adjacent its lower end has a bleed opening 24 whose walls terminate in a cup-like flange 25 within which is disposed the bottom 26 of the sleeve 21. The bleed opening 24 is provided with a plurality of small outlet openings 27 leading into the annular chamber 22 between the tube 18 and sleeve 21. Water is placed within the container 23 but now forms a relatively short column with the level at 28 submerging the lower portions of the tube 18 and sleeve 21.

Mounted on the sleeve 21 are a multiplicity of annular plates 29 having their peripheral edges spaced from the inner surface of the container 23, and the inner wall of the container 23 has mounted thereon a plurality of annular plates 31 having their inner edges spaced from the outer surface of the sleeve 21. The plates 29 and 31 constitute vertically spaced baffles providing a tortuous path alternately adjacent the inner wall of the container 23 and the exterior wall of the sleeve 21. The major portion of the bleed air through the bleed opening 24 will pass upwardly through this tortuous path past the baffles 29 and 31 and water overflowing from the annular chamber 22 will flow downwardly past these baffles. This counterflow of air and water over the relatively large baffle surfaces brings about a more complete saturation of the air exhausting through the device and, with proper design, will finally exhaust air past the baffles 32 in a fully saturated condition so that maximum cooling will be effected.

Figure 2:
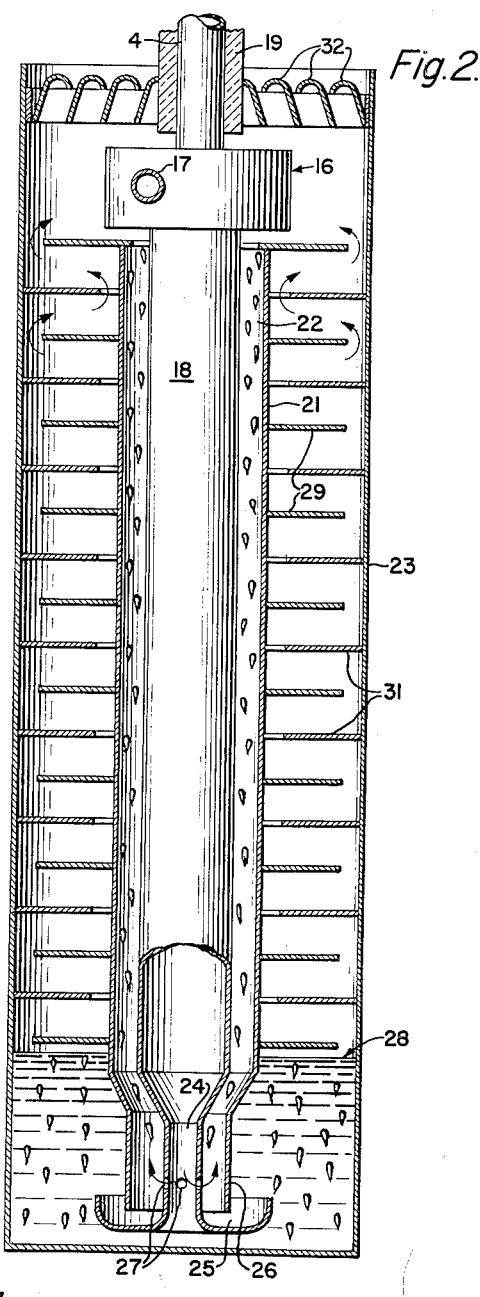
FIG. 2 is a schematic representation similar to FIG. 1 but showing a modified form of the invention.

In the operation of the cooling device of FIG. 2, only a small portion of the bleed air from the hot end of the vortex tube passes through the openings 27 into the annular chamber 22 between the tube 18 and sleeve 21. This air, in the form of a multiplicity of bubbles, passes through the water in the annular chamber 22 and in effect forms a water lift in which the head represented by the weight of the column of mixed air and water is balanced by the head represented by the weight of the water alone in the lower portion of the container 23. The rate of flow of this water can be adjusted by the portion of the bleed air which is diverted into the chamber 22 and also by the adjustment of the water level 28.

The major portion of the bleed air from the hot end of the vortex tube passes through the water in the bottom of the container 23 to effect direct cooling thereof by evaporation and then flows in intimate contact with the water passing downwardly over the baffles 29 and 31 to effect evaporation and cooling thereof so that this water enters the pool at the bottom of the container 23 at a relatively low temperature. Only a limited amount of water cooling is effected within the chamber 22. The major evaporation and major cooling of the water by its heat of vaporization is effected within the pool of water at the bottom of thee container 23 and in the baffle column between the sleeve 21 and the inner wall of container 23. The water from the container pool, which is thus in relatively cooled condition, is passed upwardly in intimate cooling contact with the outer surface of the hot tube 18 of the vortex tube by means of the water lift formed in the annular chamber 22. Since the water will again be used up as it is evaporated, a means, such as constant level control, will be employed to maintain the water level 28.

Figure 3:
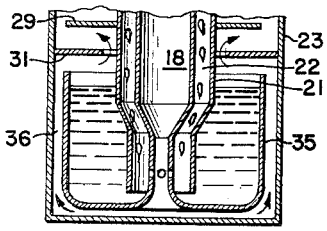
FIG. 3 is a partial sectional view, on reduced scale, of a further modification.

In the modification shown in FIG. 3, the cup-shaped flange 25 of FIG. 2 is enlarged into a bowl 35 which contains the water pool communicating with the chamber 22. In this embodiment the major volume of air from the hot end of the vortex tube 18 does not bubble through the water pool but passes through the air chamber 36 between the bowl 35 and container 23 into the baffle chamber.

Where in this specification and in the claims appended hereto the term "air" has been used for simplicity of description, it is understood that the cooling device of this invention will function with other gases and the term "air" when so used is to be construed of sufficient breadth to include gases other than air. Similarly, where the term "water" is used it is to be construed as including any liquid having a substantial heat of vaporization in the gases from the vortex tube. Where materials other than air and water are used the system will ordinarily be closed to provide for recovery thereof.

While certain preferred embodiments of the invention have been specifically disclosed, it is understood that the invention is not limited thereto, as many variations will be readily apparent to those skilled in the art and the invention is to be given its broadest possible interpretation consistent with the prior art.

What is claimed is:

1. In an air cooling device, a vortex tube having an inlet for air to be cooled, a hot tube and a cold outlet for cooled air, a chamber about said hot tube for the reception of water, means for bleeding air from the hot tube, and means for bringing said bleed air into contact with said water to effect evaporation thereof and cooling of the water and hot tube by the heat of vaporization of the water.

2. In an air cooling device, a vortex tube having an inlet for air to be cooled, a hot tube and a cold outlet for cooled air, a chamber about said hot tube for the reception of water, means for bleeding air from the hot tube, and means for passing said bleed air through said water to effect evaporation thereof and cooling of the water and hot tube by the heat of vaporization of the water, said air passing means including means for dividing the bleed air into a multiplicity of relatively small bubbles to increase the air-water contact surface and facilitate evaporation.

3. In an air cooling device, a vortex tube having an inlet for air to be cooled, a hot tube and a cold outlet for cooled air, a chamber about said hot tube for the reception of water, said vortex tube being mounted with its axis substantially vertical and its hot tube at the bottom, means for bleeding air from the hot tube, and means for feeding said bleed air into the water adjacent the lower end thereof to effect evaporation and cooling of the water by the air as it rises therethrough.

4. In a cooling device, a vortex tube having an inlet, a hot tube and a cold outlet, a chamber about said hot tube for the reception of water, means for bleeding air from the hot tube, a substantially porous bottom wall for said chamber, and means for feeding said bleed air through said porous wall into said water so that it will rise therethrough in a multiplicity of relatively small bubbles.

5. In a cooling device, a vortex tube having an inlet, a hot tube and a cold air outlet, a container about said hot tube for the reception of water, a porous plate in said container adjacent the bottom thereof dividing it into a lower air chamber and an upper water chamber, said vortex tube being disposed with its axis substantially vertical and its hot tube at the bottom, and means for bleeding air from the hot tube into said lower air chamber, said porous plate passing said bleed air into the water chamber in the form of a multiplicity of relatively small bubbles.

6. In a cooling device, a vortex tube having an inlet, a hot tube and a cold outlet, a chamber about said hot tube for the reception of water, means for bleeding air from the hot tube, a substantially porous bottom wall for said chamber, means for feeding said bleed air through said porous wall into said water so that it will rise therethrough in a multiplicity of relatively small bubbles, and a plurality of baffles at the top of said chamber through which said bleed air exhausts and which are formed to prevent the passage of entrained moisture.

7. In a cooling device, a vortex tube having an inlet, a hot tube and a cold air outlet, a container about said hot tube for the reception of water, a porous plate in said container adjacent the bottom thereof dividing it into a lower air chamber and an upper water chamber, said vortex tube being disposed with its axis substantially vertical and its hot tube at the bottom, means for bleeding air from the hot tube into said lower air chamber, said porous plate passing said bleed air into the water chamber in the form of a multiplicity of relatively small bubbles, and a plurality of baffles at the top of said chamber through which said bleed air exhausts and which are formed to prevent the passage of entrained moisture.

8. In a cooling device, a vortex tube having an inlet, a hot tube and a cold outlet, means for bleeding air from the hot tube, means for bringing water into heat exchange relationship with the hot tube, means for passing said bleed air through said water to effect evaporation and cooling thereof, means for flowing said water over an elongated surface path, and means for passing said bleed air through said path in counterdirection to the movement of said water to increase the evaporation and cooling effects.

9. In a cooling device, a vortex tube having an inlet, a hot tube and a cold outlet, a water pool in heat exchange relation with said hot tube, a water lift having an inlet communicating directly with said pool and its outlet communicating with said pool through a tortuous passage, means for feeding air from the hot tube into said water lift to effect movement of water therethrough into said tortuous passage, and means for feeding air from the hot tube into said water pool and thence into said tortuous passage in counterdirection to the movement of said water from the lift to the pool.

10. In a cooling device, a vortex tube having an inlet, a hot tube and a cold outlet, said vortex tube being disposed with its hot tube substantially vertical and at the bottom, a jacket wall about said hot tube and spaced therefrom to form a chamber, an exterior container surrounding said hot tube and jacket wall, a water pool in said container submerging the lower ends of said hot tube and jacket wall, means for bleeding a portion of air from the hot tube into the chamber between the hot tube and the jacket wall, means for bleeding another portion of air from the hot tube into the water pool and thence into the chamber between the jacket wall and the container wall, the water pool level and the bleed air fed into the chamber between the hot tube and the jacket wall being related so that said jacket chamber forms a water lift passing water from the pool upwardly in contact with the outer surface of the hot tube and then downwardly at the exterior of the jacket, said downwardly moving water and said another bleed air portion passing in counterdirection of movement within said chamber formed by the jacket and container walls.

11. In a cooling device, a vortex tube having an inlet, a hot tube and a cold outlet, said vortex tube being disposed with its hot tube substantially vertical and at the bottom, a jacket wall about said hot tube and spaced therefrom to form a chamber, an exterior container surrounding said hot tube and jacket wall, a water pool in said container submerging the lower ends of said hot tube and jacket wall, means for bleeding a portion of air from the hot tube into the chamber between the hot tube and the jacket wall, means for bleeding another portion of air from the hot tube into the water pool and thence upwardly into the chamber between the jacket wall and the container wall, the water pool level and the bleed air fed into the chamber between the hot tube and the jacket wall being related so that said jacket chamber forms a water lift passing water from the pool upwardly in contact with the outer surface of the hot tube and then downwardly at the exterior of the jacket, and means in the chamber between said jacket and container walls defining a tortuous path within which the downwardly moving water passes in intimate contact with the said another upwardly moving bleed air portion.

12. In a cooling device, a vortex tube having an inlet, a hot tube and a cold outlet, said vortex tube being disposed with its hot tube substantially vertical and at the bottom, a jacket wall about said hot tube and spaced therefrom to form a chamber, an exterior container surrounding said hot tube and jacket wall, a water pool in said container submerging the lower ends of said hot tube and jacket wall, means for bleeding a portion of air from the hot tube into the chamber between the hot tube and the jacket wall, means for bleeding another portion of air from the hot tube into the water pool and thence into the chamber between the jacket wall and the container wall, the water pool level and the bleed air fed into the chamber between the hot tube and the jacket wall being related so that said jacket chamber forms a water lift passing water from the pool upwardly in contact with the outer surface of the hot tube and then downwardly at the exterior of the jacket, a plurality of baffle plates spaced vertically of said last-mentioned chamber with the plates alternately spaced from the jacket wall and the container wall to provide a tortuous path so that said water from the water lift passes downwardly across the baffle plates in intimate contact with the said another portion of bleed air passing upwardly thereover.

13. In a cooling device, a vortex tube having an inlet, a hot tube and a cold outlet, a sleeve surrounding said hot tube to form a chamber, a container surrounding said hot tube and sleeve, a plurality of baffle plates alternately disposed on the exterior wall of the sleeve and the interior wall of the container to provide a tortuous path, the hot tube, sleeve and container being disposed substantially vertical with the hot tube at the bottom, a water pool in the bottom of said container submerging the lower ends of the hot tube and sleeve, means for bleeding a portion of air from the hot tube into the chamber formed between the hot tube and the sleeve, and means for bleeding another portion of air from the hot tube into the water pool and thence into the chamber between the sleeve and the container wall, the water level and the bleed air fed into the chamber between the tube and the sleeve being related so that said chamber forms a water lift passing water from the pool upwardly in contact with the outer surface of the hot tube and then downwardly through the tortuous path defined by the alternately disposed container baffles.

14. In an air cooling device, a vortex tube having an inlet for air to be cooled, a hot tube and a cold outlet for cooled air, means for bringing water into heat exchange relationship with said hot tube to cool said tube and the air therein, means for bleeding air from the hot tube, and means for passing said bleed air in contact with said water to effect evaporation thereof and cooling of the water and hot tube by the heat of the vaporization of the water.

15. In an air cooling device, a vortex tube having an inlet for air to be cooled, a hot tube and a cold outlet for cooled air, a water jacket for said hot tube, means for flowing water from and to said water jacket, means for bleeding air from the hot tube, and means for passing said bleed air in counter flow relation to the water to effect evaporation of the water by the bleed air and cooling of the water and hot tube by the heat of vaporization of the water.

16. In an air cooling device, a vortex tube having an inlet for air to be cooled, a hot tube and a cold outlet for cooled air, a chamber about said hot tube for the reception of water, said vortex tube being disposed with its axis substantially vertical and its hot tube at the bottom, a water pool communicating with the bottom of said chamber, means for feeding a portion of bleed air from the hot tube into said chamber to effect a water lift for flowing water from said chamber downwardly into said pool, and means for feeding another portion of bleed air from the hot tube upwardly in counter flow contact with the water to effect evaporation thereof and cooling of the water delivered to the water pool by the heat of the vaporization of the water.

17. In an air cooling device, a vortex tube having an inlet for air to be cooled, a hot tube and a cold outlet for cooled air, a water pool in heat exchange relation with said hot tube, a water lift in heat exchange relation with said hot tube and having an inlet communicating directly with said pool and an outlet communicating with said pool through a tortuous passage, means for feeding a portion of bleed air from the hot tube into said water lift to effect movement of water therethrough into said tortuous passage, and means for feeding another portion of bleed air from the hot tube into said tortuous passage in counter direction to the movement of said water from the lift to the pool whereby said water in both the lift and the tortuous passage is cooled by the heat of vaporization of the water evaporated into the bleed air.

18. In an air cooling device, a vortex tube having an inlet for air to be cooled, a hot tube, and a cold outlet for cooled air, means for bringing water into heat exchange relationship with the hot tube to cool it, and means for bleeding air from the hot tube and bringing it into contact with the water to effect evaporation thereof and cooling of the water by the heat of vaporization of the water.

UNITED STATES PATENTS

References Cited in the file of this patent

| | | |
|---|---|---|
| 313,047 | Becker | Mar. 3, 1885 |
| 2,786,341 | Green | Mar. 26, 1957 |
| 2,937,506 | Stirlen | May 24, 1960 |